(12) United States Patent
Urian et al.

(10) Patent No.: US 7,781,506 B2
(45) Date of Patent: Aug. 24, 2010

(54) POLY(VINYL ALCOHOL) COMPOSITION COMPRISING A POLYOL

(75) Inventors: David C. Urian, Pennsville, NJ (US); Peter A. Morken, Wilmington, DE (US); Donna Lynn Visioli, Lower Gwynedd, PA (US)

(73) Assignee: E.I. du Pont de Nemours and Company, Wilmington, DE (US)

(*) Notice: Subject to any disclaimer, the term of this patent is extended or adjusted under 35 U.S.C. 154(b) by 363 days.

(21) Appl. No.: 11/698,428

(22) Filed: Jan. 26, 2007

(65) Prior Publication Data

US 2008/0182937 A1 Jul. 31, 2008

(51) Int. Cl.
*C08K 5/10* (2006.01)
*C08L 29/04* (2006.01)

(52) U.S. Cl. ............... 524/317; 524/308; 524/310; 524/311; 524/312; 524/314; 524/503; 524/557; 525/56; 525/57; 525/60

(58) Field of Classification Search ............ 524/308, 524/310, 311, 312, 314, 317, 380, 386, 387, 524/388, 389, 394, 503, 557; 525/56, 57, 525/60
See application file for complete search history.

(56) References Cited

U.S. PATENT DOCUMENTS

| | | | |
|---|---|---|---|
| 3,278,663 A | 10/1966 | Graham | |
| 3,337,665 A | 8/1967 | Underwood | |
| 3,456,044 A | 7/1969 | Pahlke | |
| 3,689,469 A | 9/1972 | Inskip | |
| 3,997,489 A | 12/1976 | Coker | |
| 4,542,178 A | 9/1985 | Zimmermann | |
| 4,559,186 A * | 12/1985 | Lee | 264/2.1 |
| 4,590,106 A | 5/1986 | Hsu | |
| 4,619,793 A * | 10/1986 | Lee | 264/2.6 |
| 4,760,116 A | 7/1988 | Roberts | |
| 4,769,421 A | 9/1988 | Hwo | |
| 4,797,235 A | 1/1989 | Garland | |
| 4,885,105 A * | 12/1989 | Yang et al. | 510/296 |
| 4,886,634 A | 12/1989 | Strutzel | |
| 5,462,981 A | 10/1995 | Bastioli | |
| 5,512,378 A * | 4/1996 | Bastioli et al. | 428/484.1 |
| 6,787,512 B1 | 9/2004 | Verrall | |
| 2005/0001348 A1 | 1/2005 | Kohnen | |

FOREIGN PATENT DOCUMENTS

| | | |
|---|---|---|
| GB | 569854 A | 6/1945 |
| JP | 2004168927 A1 | 6/2004 |
| WO | 9839382 A1 | 9/1998 |
| WO | WO 98/39382 A1 | 9/1998 |

OTHER PUBLICATIONS

Tubbs, Sequence Distribution of Partially Hydrolyzed Poly(vinyl acetate), J. Polymer Sci. Part A-1, vol. 4, 623-629 (1966).
Alexy, Effect of melt processing on thermo-mechanical degradation of poly(vinyl alcohol)s, Polymer Degradation and Stability 85, 823-830 (2004).
Harréus and Zimmermann, Plastic films formed from polyvinyl alcohol, Part I: Production of the Miwiol® /plasticizer blend, Kunstharz-Nachrichten, vol. 14, pp. 1-6 (1978).
Harréus and Zimmermann, Plastic films formed from polyvinyl alcohol Part II: Processing the Miwiol® /plasticizer blend by blow extrusion, Kunstharz-Nachrichten, vol. 14, pp. 25-31 (1978).
Tubbs, Polyvinyl Alcohol Acrylate and Methacrylate Copolymers and their Applications in Textile Sizing and Films, Polyvinyl Alcohol (ed. C. A. Finch), John Wiley & Sons Ltd. (1992), 361-402.

* cited by examiner

*Primary Examiner*—David Wu
*Assistant Examiner*—Marie Reddick

(57) ABSTRACT

Disclosed are a composition, a process that can be used to produce the composition, and an article comprising or produced from the composition wherein the composition comprises or is produced from PVOH and a polyol ester plasticizer; the PVOH includes a PVOH homopolymer or copolymer; the polyol ester plasticizer includes an esterified polyol having one or more ester groups and at least one free hydroxyl group; and the process comprises combining PVOH with a polyol ester plasticizer under a condition sufficient to transesterify the poly(vinyl alcohol).

11 Claims, No Drawings

POLY(VINYL ALCOHOL) COMPOSITION COMPRISING A POLYOL

The invention relates to a poly(vinyl alcohol) composition comprising a polyol plasticizer, a process therefor, and an article therewith.

BACKGROUND OF THE INVENTION

Poly(vinyl alcohol) (PVOH) is a water soluble polymer prepared by acid- or base-catalyzed alcoholysis. It is desirable to have access to PVOH films of variable solubility for applications that have different dissolution temperature requirements. For example pouches containing detergent for consumer cleaning applications are preferably soluble in cold water, at 10° C. or above. At the opposite extreme, PVOH laundry bags preferably only dissolve in hot water.

The solubility of PVOH can be controlled by the degree of hydrolysis. For water-soluble films the hydrolysis is typically 80-100%. A common grade used for cold-water soluble film is 88% hydrolyzed PVOH. As the hydrolysis increases from 88 to nominally 100%, the water temperature required for dissolution increases.

To influence solubility of PVOH, functional comonomers can be incorporated in the PVAc polymerization to modify solubility by their disruption of PVOH crystallinity and/or their hydrophobic or hydrophilic nature. See, e.g., *Polyvinyl Alcohol-Developments*; Finch, C. A., ed., John Wiley & Sons: New York, 1992, pp 361-402 (copolymerizing an acrylate or methacrylate ester with vinyl acetate, which, after transesterification, results in a lactone functional group on the polymer chain).

In the extrusion of PVOH, grades of PVOH having the degree of hydrolysis that confer the desired solubility of the film are utilized. In some instances PVOH resins with the desired hydrolysis and molecular weight are not commercially available. One can employ blending strategies in this instance, but in many instances this may necessitate a compromise in other properties and the final dissolution temperature may still be dominated by the component with the higher dissolving temperature. Therefore it would be desirable to have alternative methods to fine-tune the solubility of resins during processing.

PVOH may be made into film by many known methods such as solution-casting or melt extrusion techniques to produce water-soluble films. Such films are also useful as packaging materials in a number of uses, for instance, where a package of chemical is premeasured and sealed, but which subsequently liberates its contents when placed in water. Examples include laundry detergents and sanitizing chemicals for hot tubs, etc.

PVOH film is also an oxygen barrier and can be used in multilayer films such as a PVOH film sandwiched between hydrophobic films. Such a composite film is resistant to water but retains oxygen barrier properties and can be useful for packaging materials that require protection from oxidation, for instance in the packaging of certain foods and medical products.

The melt extrusion process for making PVOH films is carefully managed, as PVOH exhibits a tendency to undergo decomposition in an extruder, due to screw shear and residence time under heat. The decomposition, believed to begin at less than or about 200° C., is evidenced by undesirable properties such as non-uniform properties, discontinuities in the film, coloration, embrittlement, cross-linking, loss of biodegradability, and loss of water solubility.

Plasticizers are used with PVOH in melt extruding to lower extrusion temperatures and overcome the inherent thermal instability or in softening the PVOH to provide softer, more flexible articles. Polyols such as glycerol are commonly utilized for this purpose. Glycerol triacetate has been utilized as a plasticizer with 88% hydrolyzed PVOH in WO98/39382, but glycerol triacetate is a poor plasticizer for PVOH of higher hydrolysis, such as >95% or >98%. It is known that as the hydrolysis level of PVOH increases, it becomes less compatible with non-polar molecules such as triacetin.

It is desirable to prepare biodegradable PVOH plasticized with biodegradable plasticizers that specifically assist in lowering the polymer melt temperature and the extrusion temperature and at the same time maximize water solubility by minimizing crystallinity. It is also desirable to extrude fully hydrolyzed PVOH, since some applications require reduced water solubility.

SUMMARY OF THE INVENTION

A composition comprises or is produced from poly(vinyl alcohol) and a polyol ester plasticizer wherein the poly(vinyl alcohol) includes a poly(vinyl alcohol) homopolymer or copolymer; the polyol ester plasticizer includes an esterified polyol having one or more ester groups and at least one free hydroxyl group.

A process that can be used to produce the composition comprises combining poly(vinyl alcohol) with a polyol ester plasticizer under a condition sufficient to transesterify the poly(vinyl alcohol).

An article comprises or is produced from the composition.

DETAILED DESCRIPTION

The composition can be extrudable with minimal thermal decomposition, discoloration, cross-linking, or loss of chemical and physical properties such as water solubility, biodegradability, clarity, tensile properties, flexibility, elongation, impact resistance, tear strength, heat sealability, and barrier properties.

Useful PVOH compositions can include grades of about 70% hydrolysis or above, or of about 88% or above, or of about 99% or above.

Fully hydrolyzed "100%" grades available commercially are actually about 98-100% hydrolyzed. Partially hydrolyzed grades of 80-98%, with 88% being the most common. Greater than 99% hydrolysis grades of PVOH are granular or fine powders and have thermal decomposition temperatures of about 200° C. and melting points of about 227° C. The 100% hydrolysis grade is highly crystalline and requires a temperature of about 80° C. for dissolution in water. The 88% hydrolysis grade, despite the higher acetyl group content, is soluble in water at room temperature, is much less crystalline, melts over a relatively broad temperature range around 185° C., and is less thermally stable than the 100% grade probably due to the residual 12% vinyl acetate component. The 70% hydrolysis grade, also granular, is markedly less water-soluble and less thermally stable probably due to the increased proportion of residual acetyl groups. It is known that random distribution of acetate groups in partially-hydrolyzed PVOH results in a larger melting point depression than is the case when the distribution of acetate groups is non-random; and commercial partially hydrolyzed PVOH has non-random acetate groups (R. K. Tubbs, J. Polymer Sci. Part A-1, 4, pp. 623-629 (1966)).

In percent hydrolysis, the percent refers to the molar proportion of vinyl alcohol (VOH) moieties, the remainder being unhydrolyzed vinyl acetate (VAc) moieties. Under melt processing conditions, PVAc and VAc moieties in the chain may be less stable than corresponding PVOH or VOH moieties as acetic acid can be eliminated with the formation of unsaturation in the polymer chain. According to P. Alexy et al in *Polymer Degradation and Stability* v. 85 (2004), pp. 823-830, such unsaturation can cause undesirable color formation and promote cross-linking. The acetic acid that is evolved can also be a catalyst for further reactions eliminating water or acetic acid.

Examples of PVOH copolymers are copolymers with (meth)acrylate esters such as poly(vinyl alcohol-co-methyl methacrylate (PVOH/MMA), poly(vinyl alcohol-co-methyl acrylate), in which the (meth)acrylate comonomer molar proportion is from about 2% to about 10% or from about 2 to about 6 mol %, or combinations thereof. (Meth)acrylate refers to acrylate, methacrylate, or combinations thereof. The (meth)acrylate may be present as the lactone.

For example, one known copolymer can be made by copolymerizing VAc with an ester of an acid-containing monomer such as acrylic acid or methacrylic acid or others as disclosed in U.S. Pat. No. 4,885,105, the disclosure of which is incorporated herein by reference. Also for example, VAc/methyl methacrylate (MMA) copolymer is known to undergo an alcoholysis reaction to a PVOH copolymer where the MMA carboxyl group has formed a lactone structure with a neighboring alcohol unit. The comonomer may contain from about 0.5 to about 15 mol %, or from about 0.5 to about 8 mol %, or from about 1 to about 6 mol % of methyl methacrylate. The polymers of utility here can have number average molecular weight of from about 5,000 to about 80,000, or from about 10,000 to about 120,000, or from about 20,000 to about 40,000.

The composition can comprise a polyol ester plasticizer in an amount sufficient to transesterify the poly(vinyl alcohol) whereby about 1% to about 10%, or about 1 to about 5%, or 1 to 3%, of poly(vinyl alcohol) is transesterified. Polyol ester plasticizer is an esterified polyol having one or more ester groups and at least one free hydroxyl group. The polyol ester plasticizer may act as a plasticizer and as a reactive ester meaning the reactive ester undergoes transesterification reactions with the PVOH. Suitable polyol ester plasticizers are $C_{1-10}$ or $C_{1-5}$ alkanoic acid esters of polyols having both ester and hydroxy functionalities. The ester group can effect transesterification to increase the ester content of the PVOH during thermal processing and the hydroxy group can make the polyol compatible with PVOH. The compatibility and plasticizing ability generally become better as the number of hydroxyls increases. Also PVOH with a lower pre-modification hydrolysis value can be compatible with a broader range of polyol ester plasticizers.

A polyol ester plasticizer is derived from polyols and acids. Examples of diols include ethylene glycol, polyethylene glycol, isomer of propane diol, isomer of butane diol, isomer of pentane diol, or isomer of hexane diol, or combinations of two or more thereof. The molecular weight of ethylene glycol and polyethylene glycol can be less than about 600. Examples of triols include glycerol, trimethylolpropane, isomer of butane triol, isomer of pentane triol, or isomer of hexane triol, or combinations of two or more thereof. Examples of higher polyols include erythritol, neopentyl glycol, pentaerythritol, maltitol, sorbitol, xylitol, diglycerol, triglycerol, tetraglycerol, pentaglycerol, or combinations of two or more thereof.

The acid can be a $C_{1-10}$ or $C_{1-5}$ alkanoic acid including a derivative thereof such as hydroxy, trialkylamino, or ether functional group. Examples of acid include formic acid, acetic acid, propionic acid, butanoic acid, pentanoic acid, glycolic acid, lactic acid, 3-hydroxybutyric acid, 4-hydroxybutyric acid, 4-hydroxypentanoic acid, (2-methoxyethoxy) acetic acid, 3-(dimethylamino)propanoic acid, or combinations of two or more thereof.

Specific examples of polyol ester plasticizers include, but are not limited to, ethylene glycol monoacetate, ethylene glycol monobutyrate, glycerol acetate, glycerol diacetate, glycerol monopropionate, glycerol dipropionate, glycerol monolactate, glycerol dilactate, trimethylolpropane acetate, trimethylolpropane diacetate, trimethylolpropane lactate, trimethylolpropane dilactate, sorbitol acetate, sorbitol diacetate, sorbitol triacetate, sorbitol tetraacetate, sorbitol monolactate, sorbitol dilactate, or combinations of two or more thereof. Polyols esterified with more than one kind of acid can be used, such as sorbitol monoacetate monopropionate.

The acetate esters of glycerol are often named monoacetin (glycerol monoacetate), diacetin (glycerol diacetate), and triacetin (glycerol triacetate). Hereinafter, the names glycerol monoacetate, glycerol diacetate, and glycerol triacetate are used.

Preferred are acetate esters of glycerol, namely glycerol mono- and di-acetate and mixtures thereof. Both glycerol mono- and di-acetate are subject to transesterification both within the glycerol ester and with PVOH. Thus commercially available glycerol mono- and di-acetate comprise mixtures with different levels of acetylation. Glycerol mono- and di-acetate are mixtures of unreacted glycerol, glycerol mono-, di-, and tri-acetate; the names referring to the average acetyl content. Contrary to the general conclusion disclosed in WO98/39382, glycerol triacetate is not an effective plasticizer for PVOH with 95% or higher hydrolysis. Glycerol triacetate is a single compound, not a mixture.

It is believed that at extrusion temperatures, the hydrolysis level of PVOH is changed by a transesterification process wherein ester groups are transferred from the polyol ester plasticizer or plasticizers to PVOH. The transesterification may enable a reduction of the PVOH hydrolysis level, meaning the amount of ester groups on the PVOH is increased; enhance the melt processability of the PVOH by reducing the melting point; enable utilization of PVOH-lactone copolymers, only commercially available at 99.4-99.8% hydrolysis (with water solubility temperature about 44° C.), by hydrolyzing to a lower and broader 95-99.4% hydrolysis, thereby reducing the temperature at which the copolymer dissolves in water to about 27° C.

It is also believed that the introduced ester groups are randomly located among the PVOH moieties so they are more effective at disrupting crystallinity compared with commercial partially hydrolyzed homopolymer containing blocks of the vinyl acetate moieties, thereby increasing the aqueous solubility of the PVOH.

The polyol ester plasticizer and the transesterified polyol ester plasticizer can also deliver the plasticizer requirements of the film application, such as improved flexibility, tensile strength, melting point reduction, and melt strength.

The amount of polyol ester plasticizer can be an amount sufficient to enable the desired transesterification level and thus the targeted hydrolysis level, and is from about 5% to about 30%, or from about 5% to about 20%, or from about 10% to about 15% based in the weight of the PVOH component.

While not wishing to be limited by theory, it is believed that the effectiveness of the polyol ester plasticizer is due to transesterification that takes place under extrusion conditions. Additionally, the polyol ester plasticizer is itself a plasticizer of PVOH as is its transesterification byproduct. For example, transesterification of PVOH with glycerol monoacetate or diacetate affords PVOH with a lower hydrolysis level and the byproduct, glycerol or glycerol monoacetate, both of which are effective plasticizers of PVOH. Transesterification in the homogeneous blend of PVOH and plasticizer may lead to random re-acetylation, thereby lowering the melting point and crystallinity more effectively than the VAc groups left by the commercial PVOH manufacturing processes. In other words, a 98% hydrolyzed PVOH polymer, prepared by melt transesterification with a polyol acetate will have a VAc distribution that results in a lower melting point than a 98% hydrolyzed copolymer prepared by commercial PVOH manufacturing processes. Lowering melting point may reduce the melt temperature requirement, which minimizes the decomposition previously associated with extrusion and the lower crystallinity improves water solubility. Furthermore, polyol formed by the transesterification is also compatible with and acts as a plasticizer for PVOH.

The ester moiety content of the PVOH increases during extrusion. For instance, for a plasticized extrusion where the initial PVOH grade was about 99.6% hydrolyzed; after extrusion in the presence of glycerol mono- or di-acetate, the extruded product was from 97.2% to about 99% hydrolyzed, indicating the occurrence of re-acetylation. Higher levels of reacetylation can be achieved, by the addition of more glycerol mono- or di-acetate. After extrusion, the amount of re-acetylation in the PVOH can be from about 0.1% to about 10% or 0.5 to 5.0% re-acetylation.

The transesterification ability of the polyol ester plasticizer can be assessed by melt processing the polyol ester plasticizer with PVOH, extracting all of the polyol ester plasticizer and other polyols from the PVOH article, then comparing the ester content of the PVOH before and after melt processing. Thermal processing of the PVOH with the polyol ester plasticizers can cause from about 0.5 to about 5% of the PVOH hydroxyl groups to be esterified. The esterification can be assessed with tools such as titration, DSC, IR spectroscopy, and NMR spectroscopy.

The PVOH composition can also comprise additional plasticizers, either liquid or solid that provide the balance of softness, processability, sealability, and resistance to plasticizer migration desired for the target application; processing aids to improve the handling and processing such as polyalkylene glycols of MW greater than 400, waxes, fatty acids and their salts, and stearyl amides disclosed in U.S. Pat. No. 3,997,489; fillers and extenders such as starch, modified starch, cellulose, modified cellulose; mineral fillers such as calcium carbonate, silica, or talc; antioxidants such as BHT, IRGANOX 1010 or IRGANOX B215; pigments; and dyes.

A plasticized and extrudable PVOH polymer or copolymer may also be blended with other compatible polymers and copolymers, such as ethylene-containing polymers including polyethylene and a copolymer comprising repeat units derived from ethylene, (meth) acrylic acid, (meth)acrylate, alkyl(meth)acrylate, carbon monoxide, maleic acid, maleic anhydride, or combinations of two or more thereof. Such copolymer can contain at least 66% by weight of ethylene with a molecular weight of about 4000 to 10,000. Specific examples of ethylene-containing polymers include polyethylene, ELVALOY® ethylene/n-butyl acrylate/carbon monoxide terpolymer, ELVALOY® ethylene/vinyl acetate/carbon monoxide terpolymer, ethylene-vinyl alcohol copolymer such as ELVAX®, or plasticized polyvinyl butyral copolymer such as ECOCITE® (the copolymers available from E. I. du Pont de Nemours and Company, Wilmington Del. (DuPont)).

As is well known to those skilled in the art, PVOH may contain up to about 5% water by weight, depending how long the container has been opened and the relative humidity to which it has been exposed. The addition of water is well known, particularly with PVOH/starch blends, where it aids melt extrusion in helping dissolve and melt PVOH, thus reducing the thermal requirement. However, typically it is then volatilized before exiting the extruder to avoid film defects, such as "fish eyes". It can be desirable to minimize the water content to below 5% or below 3%, to minimize the amount of evaporation of water required during extrusion. See, e.g., US patent application 2005/0001348 wherein PVOH and plasticizer are simultaneously fed to an extruder to achieve the process in a single step.

Water can be optionally added as a plasticizer and/or as a processing aid to facilitate melting or dissolution of polyvinyl alcohol, which may minimize the thermal exposure of polyvinyl alcohol. Additional water can be mixed with polyvinyl alcohol alone or in combination with plasticizers in a process step prior to melting the polyvinyl alcohol or injected directly into thermal processing equipment such as an extruder. However, high levels of water in the extrudate can cause defects due to devolatilization, for example, "fish eyes" in film. Thus some or all of the water can be removed by venting in the extruder after it has served the process aid role but before it reaches the die. While water is a process aid for polyvinyl alcohol extrusion, it can cause hydrolysis of the polyol ester plasticizers at process temperatures. This competing hydrolysis reaction process can be minimized by first melting or dissolving a mixture comprising polyvinyl alcohol, plasticizer, and water in a zone or zones of an extruder where the melt temperature is less than 200 or 220° C., venting the amount of water necessary for defect-free extrudate in subsequent zones, then heating to greater than 200 or 220° C. in a subsequent zone or zones to cause transesterification with the polyol ester plasticizer.

The thermoplastic processing of polyvinyl alcohol and the reactive polyol ester plasticizer includes process steps of mixing, heating and melting, as has been widely described in the literature and is well known to those skilled in the art. Typically the final heating and melting step is accomplished in an extruder with a die or mold attached to form an article. These operations can be accomplished in a number of ways to achieve similar end results. The steps can be sequential unit operations or combined. One operation, described in "Plastic Films Formed from Polyvinyl Alcohol. Part I. Preparation of Mowiol/Plasticizer Blends" in Resin News, (1978), 14, pp. 1-6 by Harré and Zimmermann and in U.S. Pat. No. 4,542, 178, is to mix or mix vigorously PVOH, plasticizer and other additives, causing the mixture to heat and the PVOH particles to absorb plasticizer and optionally to agglomerate to a composition that can be introduced into conventional single screw or twin screw melt extrusion devices. The melt extruder can be equipped with various end attachments or dies to make for example, profiles, pellets, single or multilayer cast films, single or multilayer blown films, parts which take the shape of a mold, or filaments. The process for making films has been described by Harréus and Zimmermann in "Plastic Films Formed from Polyvinyl Alcohol. Part II. Processing the Mowiol/Plasticizer Blends by Blow Extrusion", in Resin News (1979), 15, pp. 25-31.

Alternatively with porous grades of PVOH, such as ELVANOL® products produced by DuPont, the reactive polyol ester plasticizer can be simply mixed without heating, allowing the liquid to be absorbed into the porous PVOH. The resulting powder can then be fed to an extruder for heating, mixing, and melting. The process temperature can be in the range of from about 170 to about 210° C. or about 210 to about 245° C., or about 215 to about 245° C. The porous grades of ELVANOL® PVOH are made by a process that provides PVOH in the physical form of a microporous, absorbent, low bulk density powder. ELVANOL® PVOH thus readily absorbs liquids at room temperature while remaining a free-flowing powder.

PVOH compositions produced by this process may have melting points of from about 170 to about 220° C., or from about 190 to about 210° C. PVOH can be thermally sensitive and suffer thermal degradation, the minimum processing temperature to afford quality extrudate can be used. For example, the PVOH composition can be heated in the extruder by shear force augmented with heating or cooling from the barrels to a temperature of from about 180 to about 245° C. The desired processing temperature can be dependent on the melting point of the PVOH homopolymer or copolymer, the identity and amount of plasticizer, and the thoroughness of plasticizer introduction prior to extrusion. The appropriate extruder barrel temperature profiles and the balance of shear and barrel heats is dependent on equipment design and scale, and are all well known to those skilled in the art.

In an embodiment, a two step mixing procedure may be used wherein the polyol ester plasticizer is first added to poly(vinyl alcohol) powder before extrusion, the mixture extruded, and the extrudate pelletized. An improvement of pellet color and pellets clarity is observed, compared to non-polyol ester plasticizers. Then re-extrusion of the pelletized PVOH/polyol ester plasticizer into blown film, produced clear, water soluble films with excellent flexibility and elongation characteristics. Such melt extrudable films may provide economic improvement over solution cast films.

The PVOH compositions, which may be biodegradable, may be used to make articles including films, molded articles, thermoformed articles, tubing, rods, or containers. The film include multilayer film or sheet and can be used as packaging materials for an aqueous medium, such as detergents, agricultural and pool chemicals, dyes and pigments, fillers, fragrances, and dry adhesives; packaging material or component of sanitary napkins and incontinence clothing; plantable seed packages such as seed tapes; barrier films; release films; garbage bags for compostable waste; medical laundry bags; laundry detergent pouches, and the like.

The compositions may be formed into films and sheets by extrusion to prepare both cast and blown films. The compositions may be formed into cast films by extrusion through a slit die and calendering the resultant flat sheet. Blown films may also be prepared by extrusion through a circular or annular die to prepare a tubular film. For example but not limitation, the films and sheets are useful to prepare packaging material and packages. The sheets may be further thermoformed into articles and structures.

The films may comprise a single layer of the PVOH composition (a monolayer film). Alternatively, multilayer films or sheets comprise a layer of the PVOH composition and at least one additional layer comprising a different material.

Any film-grade polymeric resin or material as generally known in the art of packaging can be employed to prepare additional layers in a multilayer film structure. A multilayer polymeric sheet may involve at least three categorical layers including, but not limited to, an outermost structural or abuse layer, an inner or interior barrier layer, and an innermost layer making contact with and compatible with the intended contents of the package and capable of forming any needed seals. Other layers may also be present to serve as adhesive or "tie" layers to help bond these layers together.

A multilayer film can be prepared by coextrusion as follows: granulates of the various components are melted in separate extruders. The molten polymers are passed through a mixing block that joins the separate polymer melt streams into one melt stream containing multiple layers of the various components. The melt stream flows into a die or set of dies to form layers of molten polymers that are processed as a multilayer flow. The stream of layered molten polymers are cooled rapidly, for example, on a quench drum to form a layered structure. A film can also be made by (co)extrusion followed by lamination onto one or more other layers. Other suitable converting techniques are, for example, blown film (co)extrusion and (co)extrusion coating.

Films optionally may be uniaxially oriented (drawn in one direction) to provide high tensile strength in the machine direction (MD) such as is useful for tapes and straps. Alternatively, the film can be biaxially oriented by drawing in two mutually perpendicular directions in the plane of the film to achieve a satisfactory combination of mechanical and physical properties. Such biaxial stretching can be done sequentially such as first in the MD and then in the transverse direction, or simultaneously such as in the two perpendicular directions at the same time.

Orientation and stretching apparatus to uniaxially or biaxially stretch film are known in the art and may be adapted by those skilled in the art such as those disclosed in U.S. Pat. Nos. 3,278,663; 3,337,665; 3,456,044; 4,590,106; 4,760,116; 4,769,421; 4,797,235 and 4,886,634.

The film may also be laminated to a substrate such as foil, paper or nonwoven fibrous material to provide a multilayer packaging material. Lamination involves laying down a molten curtain of an adhesive composition between the substrate and the film moving at high speeds (from about 100 to 1000 feet per minute (fpm, 0.5-5 m/s) and preferably from about 300 to 800 fpm, 1.5-4 m/s) as they come into contact with a cold (chill) roll. The melt curtain is formed by extruding the adhesive composition through a flat die. Solution-based adhesive compositions may also be used to adhere the film to the substrate.

The packaging material may also be processed further by, for example but not limitation, printing, embossing, and/or coloring to provide a packaging material to provide information to the consumer about the product therein and/or to provide a pleasing appearance of the package.

Films and sheets can be used to prepare packaging materials and containers such as pouches, lidding, thermoformed containers such as trays, cups, and bowls. Other thermoformed packaging articles include blister packaging, blister components or pharmaceutical compartments for dispensers, clam shells, handling-trays, point-of-purchase display stands, two-pieces boxes (lid and base combinations), dispenser bodies, bifoldable articles, and the like.

Films such as tubular films may be processed into bags or pouches by forming seals (for example, by heat-sealing or radio-frequency welding) across the tube surface and cutting the sealed tube into lengths, thereby providing tubes with one closed end and one open end.

The compositions may be molded into articles using any suitable melt-processing technique. Commonly used melt-molding methods known in the art such as injection molding, extrusion molding, or blow molding.

Of note is a package comprising a thermoformed container such as a tray, cup, or bowl and a lidding film comprising a film comprising the PVOH compositions.

TEST METHODS

Test Method 1. Infra-Red Method for Determination of % Hydrolysis.

A series of PVOH samples with % hydrolysis values ranging from 86.6-99.6% determined by aqueous saponification method were analyzed by attenuated total reflection infrared spectroscopy (ATR). The acetate methyl absorption at 1273 cm$^{-1}$ was ratioed to the 844 cm$^{-1}$ PVOH methylene peak. A calibration curve was then plotted, and used to determine the % hydrolysis values of PVOH films.

Test Method 2. Differential Scanning Calorimetry.

Differential Scanning Calorimetry (DSC) measurements were made on a TA Instruments Q1000 thermal analysis system (New Castle, Del.) using a temperature program ramping from 20 to 250° C. at 10° C./min, cooling to 20° C., then reheating to 250° C., and used according to the manufacturer's recommendations. The melting point was determined from the endotherm of the first heat and the glass transition temperature was interpolated from the change in slope of the second heat.

Test Method 3. Nuclear Magnetic Resonance Spectra.

$^1$H NMR spectra were measured on a Bruker AVANCE DRX-500 (Billerica, Mass., USA) spectrometer in deuterated dimethyl sulfoxide at 500 MHz, and used according to the manufacturer's recommendations. $^1$H NMR was used to confirm that the extraction method used in the examples removed all of the glycerol monoacetate. The detection limit was determined to be less than 0.6 mol % relative to PVOH.

Test Method 4. Film Disintegration/Dissolution Tests.

The subject tests were performed as described in MonoSol Test Method 205 (MSTM 205) in U.S. Pat. No. 6,787,512, with minor changes. Five test specimens were cut from each film to be tested and each specimen was locked into a separate 35 mm slide mount. A beaker equipped with a thermometer was filled with 600 ml of tap water of temperature of 16+/−2° C. The height of the column of water was marked and a magnetic stirring rod added. The water was stirred using a hot plate/magnetic stirrer to develop a vortex about one-fifth the height of the water column. The depth of the vortex was marked. The slide mount was clamped into an adjustable holder so that its shorter side was parallel to the side of the beaker and its longer side was parallel to the water surface. The slide mount was positioned on the center line of the beaker, offset to the side of the beaker so as to be out of the center of the vortex but such that the film surface was positioned perpendicular to the flow of the water. The secured slide was inserted by dropping the slide and clamp into the water, such that the slide holder was completely covered by water, and timing begun. The hot plate was powered and the temperature and time when disintegration (when the film breaks apart) occurred were recorded. When all film was released from the slide mount, the slide mount was raised out of the water. Temperature and time when film dissolution (when all film fragments are no longer visible and solution becomes clear) occurred was measured. The test is repeated for the remaining 4 samples and the average of 5 assessments is reported. Heating rates were in the range 1 to 4° C./min.

EXAMPLES

Example 1

A PVOH sample ("Homopolymer 1"), obtained from DuPont as Elvanol® 90-50), was a fully hydrolyzed grade of PVOH having a Mn of 30,000, a DSC m.p. of 228° C. (enthalpy 69 J/g), and hydrolysis of 99.7% (by Test Method 1). Homopolymer 1 was blended with 15 weight % glycerol monoacetate and 1 g/kg IRGANOX B 215 (Ciba Specialty Chemicals, Inc., Basel, Switzerland) by mixing in a bag at room temperature and allowing to stand overnight. The blend was extruded through a trilobal 28 mm Werner & Pfleiderer (Stuttgart, Germany) twin-screw extruder operated at 200 rpm and equipped with a low shear screw, single vent, and a poly(vinyl chloride) (PVC) single strand die. The extruder had 6 zones with set temperatures (feed to die) of 80, 130, 160, 195, 210, 210° C. The melt temperature was 225° C. The strand was quenched on a moving belt with an air ladder, and then fed to a strand cutter. The pellets were collected and dried overnight in a vacuum oven set at 50-55° C. The pellets were then fed to a ¾" Brabender blown film single screw extruder (from C. W. Brabender Instruments, Inc., South Hackensack, N.J.) operated at 45-47 rpm and equipped with a general purpose screw, a ¾" die, and 4 heated zones set, feed to die, at 200, 210, 210, and 220° C. A transparent, colorless film with nominal 2 mil (0.05 mm) thickness was prepared. Water disintegration and dissolution properties are shown in Table 1. Soxhlet extraction of 0.2684 g film with methanol for 46 hours, then drying in a vacuum oven at 110° C. for 4 h afforded 0.2260 g dried film. The DSC melting point of the extracted and dried film showed a melting point of 221° C. (enthalpy 62 J/g). The % hydrolysis was determined to be 99.0% by Test Method 1.

The re-acetylation occurring is shown by the following comparison. This Example 1 used a fully hydrolyzed grade of polyvinyl alcohol having an initial hydrolysis level of 99.7% and an initial differential scanning calorimetry (DSC) melting point of 228° C. (enthalpy 69 J/g). After melt transesterification with glycerol monoacetate and then extraction, the product had a hydrolysis level of 99.0% and a melting point of 221° C. (enthalpy 62 J/g) by Test Method 1 (see Test Methods below). By comparison, a sample of BF70-40 PVOH (from the Chang Chung Group, Taiwan), was also determined to have a hydrolysis level of 99.0% by Test Method 1, but the DSC melting point was 227° C. (enthalpy 101 J/g). At these temperatures, the 7° C. lowering of the melting point by random re-acetylation disclosed in the invention provided an advantage in disrupting the crystallinity.

Comparative Example A

Homopolymer 1, with MW comparable to Example 1 and mp of 229° C. (enthalpy 98 J/g) and hydrolysis of 99.6% (by Test Method 1) was blended with 19.5 weight % glycerol by mixing in a bag at room temperature and allowing to stand overnight. The blend was extruded through a bilobal 30 mm Werner & Pfleiderer twin screw extruder operated at 200 rpm and equipped with a low shear screw, single vent, and a PVC single strand die. The extruder had 9 zones with set temperatures (feed to die) of 220, 220, 220, 210, 210, 190, 190, 190, and 190° C. The strand was quenched on a moving belt with an air ladder, and then fed to a strand cutter. The pellets were collected and dried overnight in a vacuum oven set at 50-55° C. The pellets were then fed to a ¾" Brabender blown film single screw extruder as described in Example 1 to afford a transparent, slightly yellow film with nominal 2 mil (0.05 mm) thickness. Water disintegration and dissolution properties are shown in Table 1. Soxhlet extraction, as described in Example 1, of 0.0562 g film afforded 0.0450 g dried film. The DSC melting point of the extracted and dried film showed a melting point of 229° C. (enthalpy 94 J/g). The % hydrolysis was determined to be 99.7% by Test Method 1.

Comparative Example B

A PVOH/MMA copolymer, designated "Copolymer 1" obtained from DuPont and prepared according to U.S. Pat. No. 3,689,469, was a fully hydrolyzed grade of polyvinyl alcohol copolymer with 2.5 mol % methyl methacrylate having a number average MW (Mn) of 34,000, a differential scanning calorimeter (DSC) m.p. of 210° C. (enthalpy 66 J/g), and hydrolysis of 99.6% (Test Method 1). Copolymer 1 was blended with 10 weight % glycerol (Aldrich, Milwaukee, Wis.) and 1 g/kg IRGANOX B 215 and the blend was extruded through a 28 mm Werner & Pfleiderer as disclosed in Example 1. The extruder had 5 zones with set temperatures (feed to die) of 80, 130, 160, 195, 210° C. The melt temperature was 213° C. The strand was quenched on a moving belt with an air ladder, and then fed to a strand cutter. The pellets were collected and dried overnight in a vacuum oven set at 50-55° C. The pellets were then fed to a ¾" Brabender blown film single screw extruder as described in Example 1. The film was transparent with a faint yellow color with a 2 mil (0.05 mm) nominal thickness. Water disintegration and dissolution properties are shown in Table 1.

A Soxhlet extractor with a 3×9.3 cm thimble was charged with 0.3120 g of the film and extracted with methanol for 40 h. The film was then dried in a vacuum oven at 110° C. for 4 hours to afford 0.2734 g dried film. The DSC melting point of the extracted and dried film showed a melting point of 212° C. (60 J/g). The % hydrolysis was determined to be 99.7% by Test Method 1.

Example 2

Copolymer 1 was blended with 20 wt % glycerol monoacetate (TCI America, Portland, Oreg.; the glycerol monoacetate sample also contained small amounts of glycerol, glycerol diacetate, and glycerol triacetate) and 1 g/kg IRGANOX B 215 and the blend was extruded as described for Example 1; the melt temperature was 234° C. After drying and extruding film as described in Example 1, a transparent, colorless film with nominal 2 mil (0.05 mm) thickness was prepared. Water disintegration and dissolution properties are shown in Table 1. Soxhlet extraction of 0.1293 g film with methanol for 48 hours, then drying in a vacuum oven at 110° C. for 5 h, afforded 0.1062 g dried film. The DSC melting point of the extracted and dried film showed a melting point of 195° C. (39 J/g). The % hydrolysis was determined to be 98.0% by Test Method 1. This example shows that extrusion of polyvinyl alcohol with glycerol monoacetate reduces the % hydrolysis of the copolymer and reduces the melting point.

Example 3

A blend of 85:15 Copolymer 1: glycerol monoacetate additionally containing 1000 ppm Irganox B215 was blended as described in Comparative Example A, then extruded through a 30 mm Werner & Pfleiderer twin-screw extruder as described for Comparative Example A. The pellets were then fed to a ¾" Brabender blown film single screw extruder as described in Example 1 with four heated zones set, feed to die, at 210, 210, 210, and 220° C. The melt temperature was 216° C. The film was transparent, soft, and tough.

An approximately 5-cm square piece of film was extracted in a Soxhlet extractor with a 3×9.3 cm thimble with methanol for 40 h. The film was then dried in a vacuum oven at 110° C. for 4 hours. The DSC melting point of the extracted and dried film showed a melting point of 191° C. (enthalpy 26 J/g). The % hydrolysis was determined to be 97.3% by Test Method 1. This is a reduction in mp of 21° C. and reduction of 2.4 percent hydrolysis (99.7 to 97.3) points. Water disintegration and dissolution properties are shown in Table 1.

Example 4

A blend of 85:15 Copolymer 1: glycerol diacetate (Aceto, Lake Success, N.Y.) additionally containing 1000 ppm Irganox B215 was blended and then extruded through a 30 mm Werner & Pfleiderer twin-screw extruder as described for Comparative Example A. The pellets were collected and dried overnight in a vacuum oven set at 50-55° C. The pellets were then fed to a ¾" Brabender blown film single screw extruder as described in Example 3. The melt temperature was 216° C. The film was transparent and faintly yellow, soft, and tough.

An approximately 5-cm square piece of film was extracted in a Soxhlet extractor with a 3×9.3 cm thimble with methanol for 40 h. The film was then dried in a vacuum oven at 110° C. for 4 hours. The DSC melting point of the extracted and dried film showed a melting point of 191° C. (enthalpy 23 J/g). The % hydrolysis was determined to be 97.2% by Test Method 1. This is a reduction in mp of 21° C. and reduction of 2.5 hydrolysis percentage points. Water disintegration and dissolution properties are shown in Table 1.

Comparative Example C

A blend of 85:15 Copolymer 1: glycerol triacetate (Aceto, Lake Success, N.Y.) additionally containing 1000 ppm Irganox B215 was blended and then extruded through a 30 mm Werner & Pfleiderer twin screw extruder as described for Comparative Example A. The melt temperature was 204° C. The pellets were collected and dried overnight in a vacuum oven set at 50-55° C. The pellets were then fed to a ¾" Brabender blown film single screw extruder as described in Example 3. The melt temperature was 216° C. The film was stiff, and readily torn, which is indicative of poor plasticization.

An approximately 5-cm square piece of film was extracted in a Soxhlet extractor with a 3×9.3 cm thimble with methanol for 40 h. The film was then dried in a vacuum oven at 110° C. for 4 hours. The DSC melting point of the extracted and dried film showed a melting point of 204° C. (enthalpy 49 J/g). The % hydrolysis was determined to be 98.8% by Test Method 1. This is a reduction in mp of 8° C. and reduction of 0.9 hydrolysis percentage points. Water disintegration and dissolution properties are shown in Table 1.

TABLE 1

Water Disintegration of Plasticized Films

| Example | Base PVOH | Plasticizer | Temp[1] | Temp[2] |
|---|---|---|---|---|
| Homopolymer Examples | | | | |
| Ex. 1 | Homopolymer 1 | Glycerol monoacetate | 25° C. | 56° C. |
| Comp. Ex. A | Homopolymer 1 | glycerol | 64° C. | 73° C. |
| Copolymer Examples | | | | |
| Ex. 2 | Copolymer 1 | Glycerol monoacetate | 19° C. | 27° C. |
| Comp. Ex. B | Copolymer 1 | glycerol | 38° C. | 50° C. |
| Ex. 3 | Copolymer 1 | Glycerol monoacetate | 17° C. | 35° C. |
| Ex. 4 | Copolymer 1 | glycerol diacetate | 17° C. | 38° C. |
| Comp. Ex. C[3] | Copolymer 1 | glycerol triacetate | 21° C. | 40° C. |

[1]Disintegration began
[2]Dissolution completed
[3]Film was brittle and easily torn Table 1 shows extrusion of Copolymer 1 or Homopolymer 1 with glycerol monoacetate afforded films with reduced disintegration and dissolution temperatures. Films with different disintegration and dissolution temperatures could be readily prepared by simply adjusting the variables such as time, temperature, starting solubility, and hydrolysis of the PVOH, transesterification agent loading, and amount of removal of transesterification agent during processing.

TABLE 2

Properties of Films and Polymer Obtained By Extracting Film

| Example | Plasticizer | Melting Point | Enthalpy | % Hydrolysis | Film Strength |
|---|---|---|---|---|---|
| Homopolymer (mp 228° C., enthalpy 69 J/g)[#] | | | | | |
| Ex. 1 | Glycerol monoacetate | 221° C. | 62 J/g | 99.0% | Good |
| Comp. Ex. A | Glycerol | 229° C. | 94 J/g | 99.7% | Good |
| Copolymer (mp 210° C., enthalpy 66 J/g) Examples | | | | | |
| Ex. 2 | Glycerol monoacetate | 195° C. | 39 J/g | 98.0% | Good |
| Comp. Ex. B | Glycerol | 212° C. | 60 J/g | 99.7% | Good |
| Ex. 3 | Glycerol monoacetate | 191° C. | 26 J/g | 97.3% | Good |
| Ex. 4 | Glycerol diacetate | 191° C. | 23 J/g | 97.2% | Good |
| Comp. Ex. C | Glycerol triacetate | 204° C. | 49 J/g | 98.8% | Poor* |

[#]For Ex. 1; PVOH homopolymer for Comp. Ex. A had mp 229° C. with enthalpy 98 J/g.
*Film was brittle and easily torn.

Table 2 shows the film strength observation of the film as produced, the DSC melting point, and enthalpy and ATR % hydrolysis of the polyvinyl alcohol after removal of the plasticizer. It can be seen that the polyol ester plasticizers such as glycerol monoacetate and glycerol diacetate reduced the melting point, enthalpy, and % hydrolysis of PVOH resin and effectively plasticized the polymer. Glycerol in Comparative Examples A and B did not lower the melting point or hydrolysis. Glycerol triacetate (Comparative Example C) was a poor plasticizer and its films were brittle and easily torn.

The invention claimed is:

1. A composition comprising or produced from a polyol ester plasticizer and poly(vinyl alcohol) wherein
the poly(vinyl alcohol) comprises poly(vinyl alcohol-co-methyl methacrylate), poly(vinyl alcohol-co-methyl acrylate), or combinations thereof and has at least about 80% hydrolysis;
the polyol ester plasticizer comprises an esterified polyol having one or more ester groups and at least one free hydroxyl group and is present in the composition in an amount sufficient to transesterify and increase the ester content of the poly(vinyl alcohol); and
the polyol ester is derived from one or more polyols and one or more $C_{1-5}$ alkanoic acids and the $C_{1-5}$ alkanoic acid optionally comprises a functional group including hydroxy, trialkylamino, ether, or combinations of two or more thereof.

2. The composition of claim 1, wherein about 0.1% to about 10% of the poly(vinyl alcohol) is transesterified.

3. The composition of claim 1 wherein the polyol ester plasticizer is derived from polyols and acids and the polyol comprises ethylene glycol, polyethylene glycol, isomer of propane diol, isomer of butane diol, isomer of pentane diol, isomer of hexane diol, glycerol, trimethylolpropane, isomer of butane triol, isomer of pentane triol, or isomer of hexane triol, erythritol, neopentyl glycol, pentaerythritol, maltitol, sorbitol, xylitol, diglycerol, triglycerol, tetraglycerol, pentaglycerol, or combinations of two or more thereof.

4. The composition of claim 3 wherein the polyol ester plasticizer comprises ethylene glycol monoacetate, ethylene glycol monobutyrate, glycerol acetate, glycerol diacetate, glycerol monopropionate, glycerol dipropionate, glycerol monolactate, glycerol dilactate, trimethylolpropane acetate, trimethylolpropane diacetate, trimethylolpropane lactate, trimethylolpropane dilactate, sorbitol acetate, sorbitol diacetate, sorbitol triacetate, sorbitol tetraacetate, sorbitol monolactate, sorbitol dilactate, sorbitol monoacetate monopropionate, or combinations of two or more thereof.

5. The composition of claim 1 wherein the polyol ester plasticizer is an acetate ester of glycerol.

6. The composition of claim 1 wherein the polyol ester plasticizer is glycerol monoacetate, glycerol diacetate, or combinations thereof and the polyol optionally comprises acetylation.

7. The composition of claim 1 wherein the poly(vinyl alcohol) has at least about 70% hydrolysis and the composition has less than 3 weight % water content.

8. The composition of claim 1 wherein the poly(vinyl alcohol) has 99.4-99.8% hydrolysis and the poly(vinyl alcohol) in the composition has reduced hydrolysis as compared to poly(vinyl alcohol) used for producing the composition.

9. The composition of claim 1 wherein the methacrylate or acrylate is present in the poly(vinyl alcohol) in the range of about 2% to about 10% or about 2% to about 6%, based on mole %.

10. The composition of claim 1 wherein about 0.5 to about 5% of the poly(vinyl alcohol) is transesterified and the composition contains less than 3 weight % water.

11. The composition of claim 1 further comprising an additional polymer comprising an ethylene polymer, a polyvinyl butyral copolymer, or combinations thereof wherein the ethylene polymer comprises polyethylene, an ethylene copolymer, or combinations thereof; the ethylene copolymer comprises repeat units derived from ethylene and alkyl (meth)acrylate, vinyl acetate, vinyl alcohol, carbon monoxide, or combinations of two or more thereof; and the alkyl group in the alkyl (meth)acrylate has about 1 to about 12 carbon atoms per group.

\* \* \* \* \*